(No Model.) 2 Sheets—Sheet 1.
H. A. ADAMS.
COMBINED BARREL AND BODY CART.
No. 461,590. Patented Oct. 20, 1891.
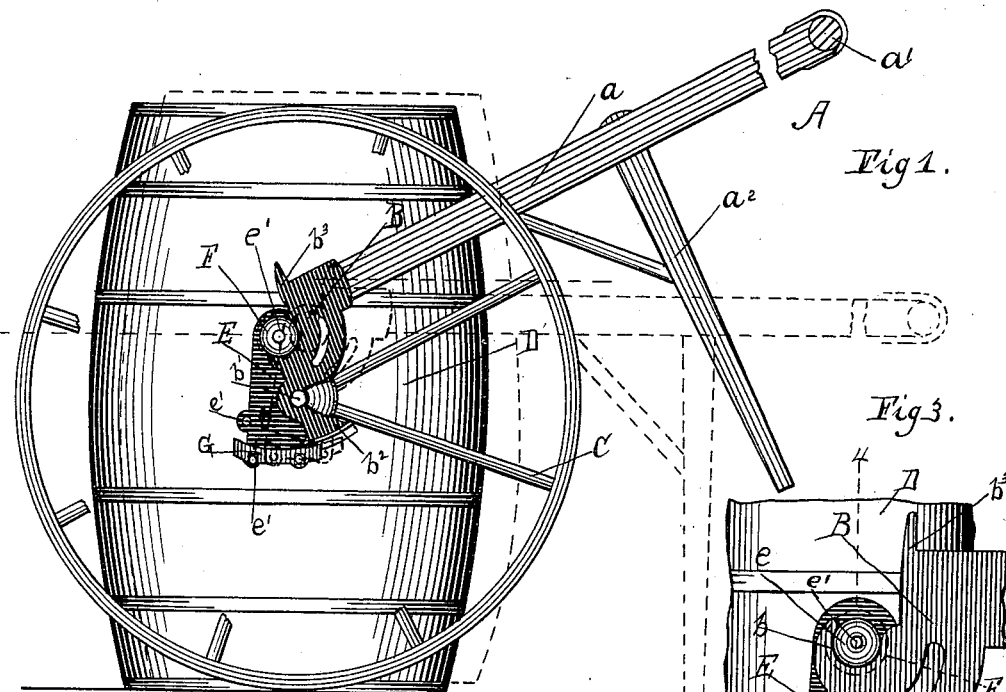
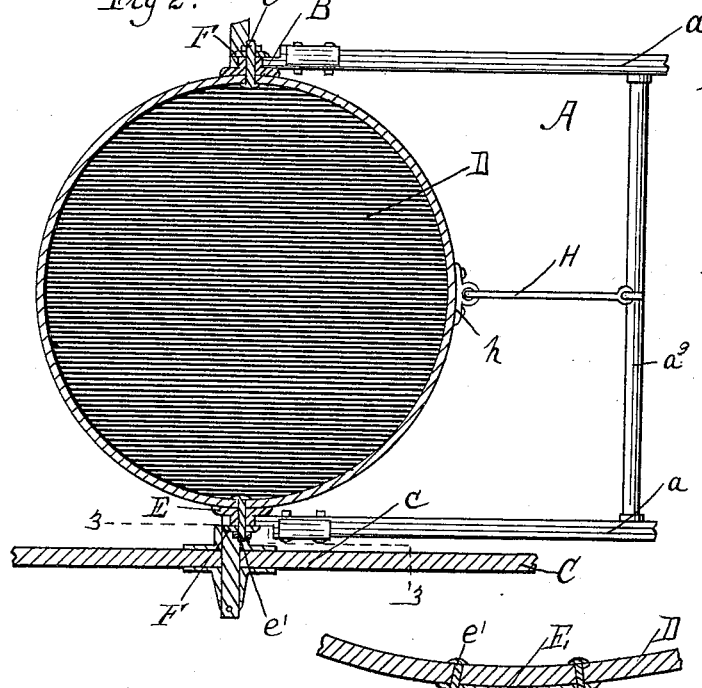
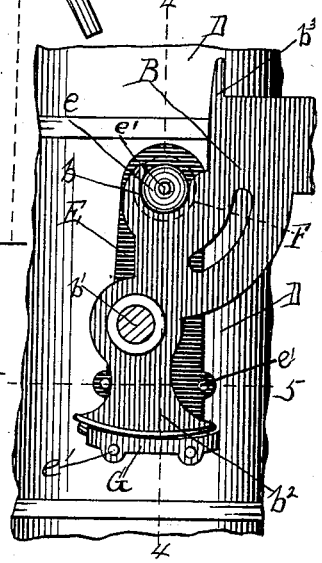
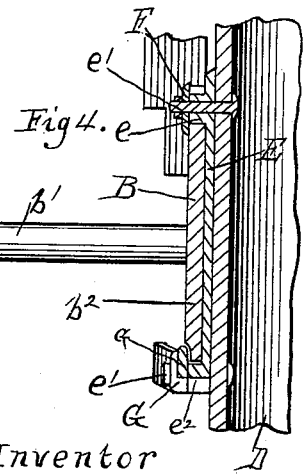
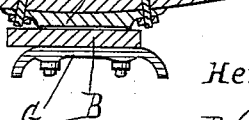
Witnesses
W. C. Carlier
J. L. Tunison
Inventor
Henry A. Adams
By Coburn & Thacher
Attys
THE NORRIS PETERS CO., PHOTO-LITHO., WASHINGTON, D. C.

(No Model.) 2 Sheets—Sheet 2.

H. A. ADAMS.
COMBINED BARREL AND BODY CART.

No. 461,590. Patented Oct. 20, 1891.

Witnesses
W. C. Corlies
J. L. Tunison

Inventor
Henry A. Adams
By Coburn & Thacher
Attys

UNITED STATES PATENT OFFICE.

HENRY A. ADAMS, OF SANDWICH, ILLINOIS.

COMBINED BARREL AND BODY CART.

SPECIFICATION forming part of Letters Patent No. 461,590, dated October 20, 1891.

Application filed August 14, 1890. Serial No. 361,952. (No model.)

*To all whom it may concern:*

Be it known that I, HENRY A. ADAMS, a citizen of the United States, residing at Sandwich, in the county of De Kalb and State of Illinois, have invented certain new and useful Improvements in Combined Barrel and Body Carts, which are fully set forth in the following specification, reference being had to the accompanying drawings, in which—

Figure 6:
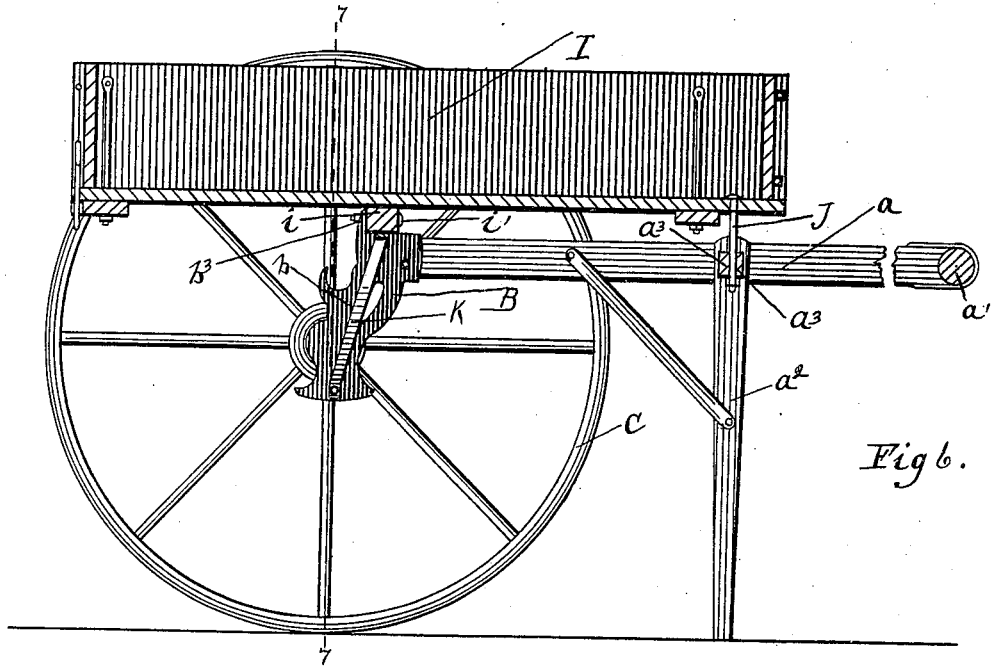
Figure 7:
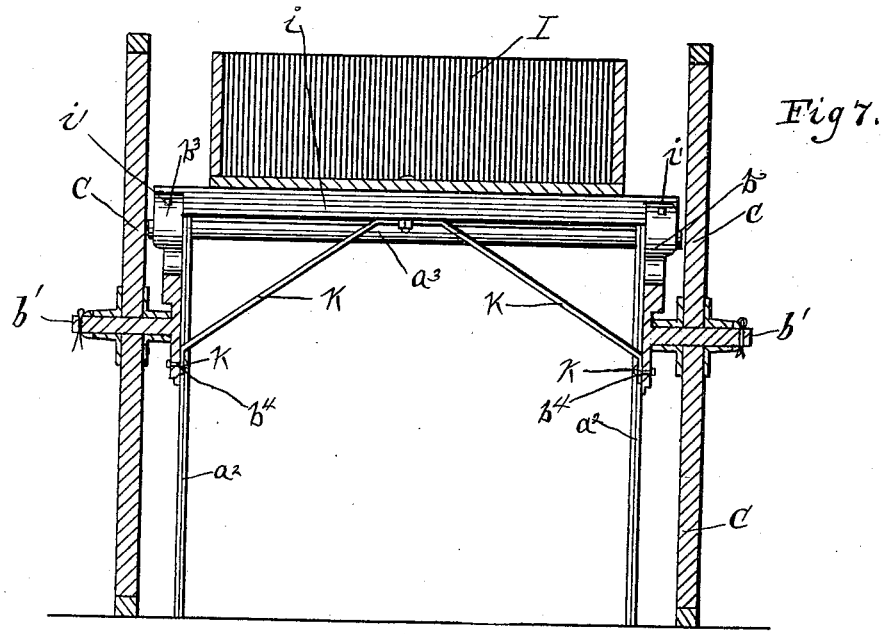

Figure 1 represents a side elevation of a barrel-cart embodying my improvements, the central portion of the outside wheel being mostly broken away; Fig. 2, a plan view of the same; Fig. 3, a detail section taken on the broken line 3 3 of Fig. 2; Fig. 4, a section of the same, taken on the line 4 4 of Fig. 3; Fig. 5, a detail plan section of the same, taken on the line 5 5 of Fig. 3; Fig. 6, a longitudinal section showing the same truck with an ordinary cart-box mounted thereon; and Fig. 7 a cross-section of the same, taken on the line 7 7 of Fig. 6. All the figures are upon the same scale, with the exception of Figs. 3, 4, and 5, which are upon one scale, but enlarged considerably from the others.

My invention relates to a hand-cart the truck of which is adapted to engage with, lift, and transport barrels, and also to have a cart-body applied thereto, whereby the cart is adapted for use both as a barrel-cart or as an ordinary cart, and so is of general utility.

I will proceed to describe in detail the construction of a cart in which I have embodied my invention in practical form, and will then point out definitely in claims the special improvements which I believe to be new and wish to secure by Letters Patent.

In the drawings, A represents the draft-frame of the cart, which consists, as usual, of two side bars $a$ and a cross-bar $a'$ at the front, and is also provided with resting or supporting posts $a^2$, attached to the respective side bars, and also a bracing cross-bar $a^3$ between the side bars near the upper ends of said supports.

At the rear end of each side bar $a$ is an iron casting B, which is shaped substantially as seen in Fig. 3 of the drawings and is rigidly fastened to the end of each bar. This casting depends from the end of its bar and is also inclined backward somewhat, so as to set just in the rear of the bar. At the upper portion of this rear set portion the casting is provided with a concave recess $b$, something in the shape of a hook and adapted to receive a circular stud or journal of corresponding form. A little below this hook-recess the casting is provided with a stud-axle $b'$, on which the wheels C are mounted to complete the carrying or truck portion of the cart. The casting extends down somewhat below the axle and terminates in a widened foot $b^2$, of circular form, being convex upon its outer edge surface. At the extreme upper end of the casting there is also a short upright lug or projection $b^3$ extending upward just at the rear end of the side bar. It will be seen that this casting B is the main device connecting the wheels and the draft-frame, and also that it is a kind of hanger, as it depends from the said frame. These parts—namely, the draft-frame, the hangers, and the wheels—constitute the sole structure for supporting and carrying a barrel or cart-body, the hangers being adapted to take either, as will be presently described; but it is evident that this structure does not make of itself a complete truck device, for there is no stay between the carrying-wheels or the rear ends of the draft-frame. It is one of the peculiarities of my invention that this staying or bracing device is supplied by either the barrel or the cart-body, so that whichever is applied to the carrying-frame constitutes this bracing or staying feature of the structure necessary to make it a complete cart or truck.

A barrel D, intended for use with this carrying device, must be provided with a special connecting device. This device as I have made it and as shown in the drawings consists of a cast bracket E of same length and adapted upon its face to fit the outside of the barrel lengthwise. This bracket is provided at its upper end with a short round stud $e$, projecting outward from its outer face and forming the supporting-journal for the barrel, as will be presently explained. The bracket is fastened to each side of the barrel by means of bolts $e'$ passing through from the inside of the barrel and provided with nuts on the outside of the bracket. For convenience one of these bolts may be passed through the stud-journal $e$, and a washer F is placed upon the outer end of this upper bolt, which is of somewhat larger diameter than the stud-journal, against the outer end of which it abuts. At the lower end of the bracket there is an offset $e^2$, which provides a projection extending outward somewhat beyond the face of the bracket. It is something like an outwardly-projecting flange, and, in fact, may be made as such, if desired, and is slightly concave upon its upper face, this concavity corresponding with the convexity of the foot at the lower end of the hanger B. A guide G is fastened to the outside of the flange or offset by means of suitable bolts. It is of such width as to extend a slight distance above the upper face of the offset, and is slightly curved to correspond to the curvature of this seat, and at each end is provided with a bend $g$, projecting beyond the respective edges of the bracket and curving or flaring outward, as seen in Figs. 1 and 5 of the drawings.

When it is desired to connect the draft-frame with the barrel thus equipped, the former is brought into position, so that the barrel will stand between the wheels, and the frame is then tilted upward on its wheels in the position shown in full lines in Fig. 1, and the hangers B are caused to engage with the barrel by receiving the stud-journals thereon in the concave sockets $b$ of the hangers. In making this connection the convex foot of each bracket passes into its seat, formed by the offset $e^2$ and the guide G, the flaring ends of the latter serving to direct this lower end of the hanger into this seat. This construction provides a stiff bracing-support for the barrel below the supporting-sockets and below the axles of the wheels, thereby connecting the draft-frame to the barrel in a substantially rigid manner. When it is desired to lift the barrel for transportation, the draft-frame is tilted downward, as seen in dotted lines in Fig. 1, when it is evident that the barrel will be raised from the ground, the stud-journals thereon being set at a distance from the bottom of the barrel somewhat less than the height of the supporting-sockets in the hangers above the bearing-point of the wheels. The draft-frame is also provided with a retaining-hook H, linked to the cross-bar $a^3$ and adapted to hook into or otherwise engage with a socket or eye-bracket $h$ on the front of the barrel. When the barrel is thus raised, the firm bracing-supports by which it is connected to the draft-frame make it practically a rigid part of the latter, staying and bracing the frame at its rear end between the wheels, and so completing the structure as a barrel-cart. It will be understood, of course, that when the barrel is to be rested at any place it is only necessary to tilt the frame upward, as shown in Fig. 1. This carrying-frame is also adapted for the attachment of a cart-body without changing its construction when it is desired to provide an ordinary hand-cart. For this purpose a body I is provided, of any ordinary construction, except that it has a cross bar or sill $i$ underneath its bottom and projecting out therefrom a little on each side. This sill is preferably arranged a little back of the center of the body. When the body is applied to the carrying-frame, it is set upon the latter with the sill brought back at each of its projecting ends against the lugs $b^3$ at the upper end of the hangers B, and is fastened to said lugs by ordinary bolts $i'$. The front end of the body is fastened to the frame by a bolt J passing down through the bottom of the body and the cross-bar $a^3$. If desired, for convenience the barrel-hook H may be detached from this cross-bar and the bolt J passed through the same hole as the eyebolt of the hook. The body is also braced and stayed by brace bars or rods K, which are fastened at their inner ends to the cross-sill of the body, from which they extend downward and outward to the lower ends of the respective hangers B, to which they are fastened by nut-bolts $k$, the hangers having a perforation $b^4$ at their lower ends for these bolts. These braces may be made separately or in one piece, the latter construction being shown in Fig. 7 of the drawings. It will be seen that an ordinary hand-cart will thus be provided adapted for all ordinary uses of a hand-cart and without changing the structure of the carrying-frame. It will be seen, also, that here, too, the structure is not completed until the body is applied and is connected to the respective hangers, when it becomes a supporting stay or brace for the rear part of the draft-frame and wheels, the same as before, when the connection with the barrel was described.

In details of construction and minor devices there may be changes made in the parts herein described and set forth. Hence I do not wish to be understood as limiting my invention to all of the details in construction and arrangement herein set forth.

Having thus described my invention, what I claim as new, and desire to secure by Letters Patent, is—

1. The draft-frame A, in combination with the hangers B, provided with open sockets $b$ and a foot $b^2$, extending below the wheel-axles, a barrel D, and the brackets E, attached to said barrel and provided with studs $e$, and a guideway at their lower ends for the foot of the hangers, substantially as and for the purposes specified.

2. The barrel D, in combination with the brackets E, provided with studs $e$ at their upper ends and offsets for flanges $e^2$ at their lower ends, the guide G, attached to the offset and provided with flaring ends, and the hangers B, provided with open sockets $b$, and a widened foot $b^2$, adapted to enter the space within the guides G when the frame is connected to the barrel, substantially as and for the purposes specified.

3. The draft-frame A, in combination with the hangers B, provided with open sockets $b$ and upright lugs or projections $b^3$, the supporting-wheels C on axles attached to the hangers, and a barrel or cart-body connected to the hanger, as described, and constituting the rear staying or bracing device for the frame, substantially as and for the purposes specified.

HENRY A. ADAMS.

Witnesses:
H. E. ADAMS,
FRANK J. DRYBURGH.